United States Patent [19]
Palazzetti et al.

[11] 3,934,337
[45] Jan. 27, 1976

[54] METHOD OF CONNECTING A TERMINAL TO A WIRE

[75] Inventors: Mario Palazzetti, Avigliana (Turin); Franco Grisotto, Turin, both of Italy

[73] Assignee: Fiat Societa per Azioni

[22] Filed: Aug. 15, 1974

[21] Appl. No.: 497,795

[30] Foreign Application Priority Data
Sept. 21, 1973 Italy..................69784/73

[52] U.S. Cl................. 29/628; 29/630 R
[51] Int. Cl.². ........................ H01R 43/00
[58] Field of Search.......... 29/628, 630 R, 624, 484, 29/203 MN; 317/122

[56] References Cited
UNITED STATES PATENTS

| | | | |
|---|---|---|---|
| 2,299,140 | 10/1942 | Hanson | 317/122 |
| 3,333,047 | 7/1967 | Geoffroi | 29/628 |
| 3,337,711 | 8/1967 | Garscia | 29/628 |
| 3,418,444 | 12/1968 | Ruehlemann | 29/628 |
| 3,436,818 | 4/1969 | Merrin et al. | 29/628 |
| 3,519,778 | 7/1970 | Gibson | 29/628 |
| 3,627,903 | 12/1971 | Plummer | 29/628 |
| 3,812,581 | 5/1974 | Larson et al. | 29/628 |

Primary Examiner—C. W. Lanham
Assistant Examiner—James R. Duzan
Attorney, Agent, or Firm—Sughrue, Rothwell, Mion, Zinn & Macpeak

[57] ABSTRACT

A method of attaching terminals to the wires of a cable having a plurality of wires all insulated from one another with separate insulating layers is disclosed, wherein the wires are surrounded, in the region where a terminal is to be connected, by a liquid conductive material. After the outer cover of the cable has been removed (if it has one), a terminal element is positioned in contact with the liquid conductive material adjacent the wires of the cable at the said region. A rising voltage is then applied between the terminal and one end of the wire which is to be connected to the terminal. The voltage continues to rise until the occurrence of dielectric breakdown of the insulation surrounding the wire to be connected allowing a spark to jump from the wire to the terminal and to burn a hole through the insulating layer allowing the liquid conductive material to flow in and make contact with the wire. Subsequent solidification of the liquid conductive material makes the connection permanent.

2 Claims, 3 Drawing Figures

METHOD OF CONNECTING A TERMINAL TO A WIRE

BACKGROUND OF THE INVENTION

The present invention relates to a method of connecting a terminal to an insulated electrical wire, which is particularly suitable for use on multicore cables of small diameter to facilitate their use in the wiring systems of motor vehicles, particularly for the distribution of control signals.

In many wiring systems it is desirable to use extremely small conductors, especially for lines which are to carry low power signals such as data or control signals, since it is often preferable to reduce the weight and bulk of the wiring system and also to economise on the materials of the conductors, which account for a large part of the cost of a wiring system. In addition the use of bundles of extremely small wires, termed "micro-cables" is often preferable in systems involving a large number of wires.

The term micro-cable as used in the specification, will be understood to refer to a cable having a plurality of conductive wires each having a diameter of the order of tenths and hundredths of a millimeter, and being provided with an individual insulating layer. Normally an outer insulating cover would be provided to hold the individual wires together as a single cable. It is possible to employ transceivers associated with various components, particularly for the distribution of data signal or control signals, in order to reduce the number of wires in a wiring system, and therefore reduce the bulk and complexity of the system as a whole. With such an arrangement coded modulation signals carried by one wire (single-wire installation) or by two wires (double-wire installation) are used. However, the cost of apparatus of this type is so high that its use is only justifiable in sophisticated systems such as are found, for example, on board aeroplanes.

Thus, for the transmission of control signals on motor vehicles, where the use of such sophisticated techniques is not justified, it is necessary to use conductor systems in which control signals are conducted individually on separate conductors to the various components. The conductors may be constituted, for example, by the wires of one or more micro-cables. One advantageous chracteristic of systems utilising micro-cables is that, since each wire has a very small overall dimension, more wires than are necessary can be used to produce a redundant system equipped with multiple circuits, thereby more effectively ensuring security of operation and effectual transfer of a signal. Up to the present, however, the utilization of micro-cables have been difficult largely because of the small diameter of the component wires, which is such an advantage in other respects. The small size makes the wires difficult to manipulate, and operating on such wires to form connections with conventional methods and equipment, even if possible at all, is extremely difficult, time consuming and thus expensive.

OBJECT OF THE INVENTION

The object of the present invention is to provide a method for connecting terminals to the leads of a cable, particularly a micro-cable, which is simple and inexpensive, and in which identification of the various wires of the cable is rendered unnecessary.

SUMMARY OF THE INVENTION

According to the present invention, there is provided a method for connecting and attaching a terminal to a wire of a cable having a plurality of wires each comprising a conductive core and a layer of insulation by means of which all the wires are insulated from each other, the wires being held together by an outer insulating cover, comprising the steps of: baring one end of the conductive core of a wire to which a conductive element is to be connected to form a terminal at a point along the length of the cable; removing part of the outer insulating cover from the cable over a region on either side of the said point; placing an element of conductive material which is to form the terminal adjacent the wires of the cable at the said point; surrounding a part of this element, and the wires of the cable in this region, with a hardenable liquid conductive material; applying between one end of the wire to be connected and the element forming the terminal, a voltage which rises until it reaches a value at which dielectric breakdown causes perforation of the insulation surrounding the core of the wire thereby allowing the liquid conductive material to pass through the perforation and to contact the conductive core of the wire, the value of the applied voltage falling rapidly immediately after the occurrence of dielectric breakdown of the insulation; and, subsequently causing hardening of the liquid conductive material to effect a permanent connection and attachment between the wire and the terminal.

The present invention also comprehends a cable fitted with terminals by the method of the invention as defined above, and also an installation for the distribution of electrical energy on a vehicle having a system for directing control signals including at least one cable fitted with terminals by the method of the invention.

Other features and advantages of this invention will become apparent from the following description with reference to the accompanying drawings, which is provided purely by way of non-restrictive example.

DESCRIPTION OF THE PREFERRED EMBODIMENT

The invention is particularly suitable for use with micro-cables and thus will be described in relation thereto.

Figure 1:
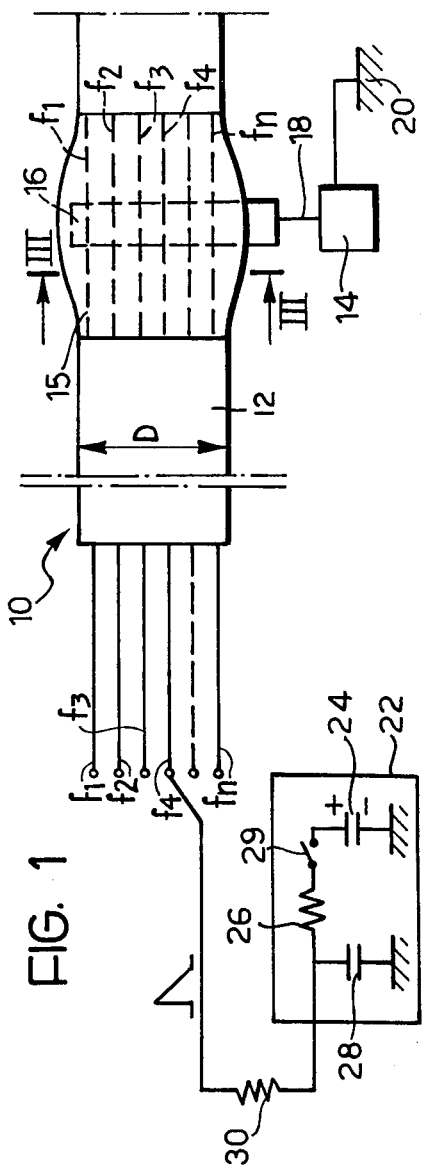
FIG. 1 illustrates diagrammatically a method of connection of a terminal to a wire of a multicore micro-cable.

Referring now to FIG. 1, there is shown a micro-cable generally indicated 10, constituted by a plurality of extremely thin conductor wires f1, f2, f3...fn which are all provided with individual insulators by means of which they are insulated from each other, and held together and covered by an insulating cover 12.

Figure 3:
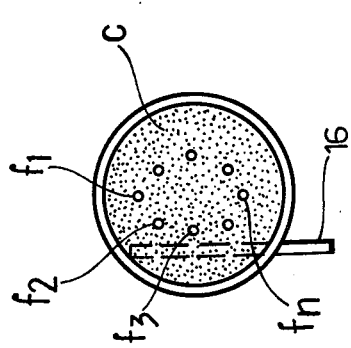
FIG. 3 is a cross section taken on the line III—III of FIG. 1.

When it is desired to connect one of the wires of the micro-cable to a component of an electrical installation, by the method of this invention, the following steps are taken: At one end, the left end in FIG. 1, of the micro-cable 10, a short section of the insulating cover 12 is removed and one of the ends of the wires has its individual insulation removed to allow connection thereto of a source of electricity. In FIG. 1 the wire f4 is shown so connected as an example. At the point along the cable where an electrical connection is to be made the cover 12 is removed over a short section 15. Unless the individual insulating covers of the wires are colour coded, and in most micro-cables there would usually be too many wires for this to be practicable, it is not possible to determine which of the wires uncovered at the section 15 is the wire f4 except by baring them all and applying a signal along the wire f4 from the left hand end and trying all the wires at the section 15 in turn until the wire carrying the signal is found. The method of the present invention obviates the necessity for such a procedure. A terminal 16 in the form of a small bar or strip of conductive material is positioned, in close proximity to the outer wires of the bundle, but so as to avoid damage to these wires which, because they are extremely thin, are rather fragile. The terminal 16 is positioned so as to project laterally from the micro-cable to facilitate its subsequent connection either to another conductor or directly to the terminal of a component. Then a quantity of a known type of conductive hardenable liquid material C is poured over the zone 15 so that it fills the interstices between the wires f1 to fn of the micro-cable over the section 15 and surrounds part of the terminal 16. The material C is shown in FIG. 3. The terminal 16 is then connected to ground either directly or through a component 14 of the circuit to which it is to be fitted in the operating position. This latter arrangement is advantageous if the micro-cable is already fitted in the working position, but is only possible if the component 14 of the circuit to which the wire is connected can safely withstand the relatively high current which flows through the connection, as will be described below. As shown in FIG. 1 the terminal 16 is connected to the electrical component 14 by a wire 18, and the component 14 is grounded at 20. The output of a ramp voltage generator 22, comprising a battery 24, a high value resistor 26, a capacitor 28, and a switch 29, is connected via a resistor 30 to the free end of the wire f4 (the left end in FIG. 1).

A ramp voltage produced by the ramp voltage generator 22 is then applied between the wire f4 and ground. This voltage rises until reaching a value corresponding to the voltage of dielectric breakdown of the insulating material of the wire; when the applied voltage reaches this value the insulating material is perforated in the section 15 between the wire f4 and the terminal 16. The conductive liquid C, which is still in the liquid state, flows through the perforation in the insulator covering the wire f4 to come into intimate contact with the conductive core of the wire f4. Subsequently the material C hardens to form a permanent electrical connection between the wire f4 and the terminal 16. As soon as dielectric breakdown of the insulator surrounding the wire f4 occurs the capacitor 28 discharges and the voltage falls rapidly.

The hardenable liquid C may be of any suitable type, for instance it may be a hardening resin reinforced with conductive materials such as silver and graphite. A material of this nature is avaliable commercially under the trade name Elecolit 350, and is sold by the firm Avanzini of Cologno Monzese (Milan). Alternatively, the material C may be a solder alloy such as, for example, the tin-based alloy sold by the firm Cofermet Metalli S.p.A. of Milan. The rapid fall of the ramp voltage once perforation of the insulator has occurred ensures that only the insulation of the wire f4 is perforated, and this only in the region 15 and not at other places.

To connect other wires or other points of the same wire with other components a similar procedure is used. The insulation is removed from the free end or ends of the wire or wires to which connection is to be effected, and a section of the outer cover is removed at the point or points along the cable 10 at which it is desired to make the connection. Then a terminal, such as the terminal 16, is positioned adjacent the wires at the connection point or points and a hardenable liquid conductive material C is poured over the wires so as to enclose these and a part of the terminal, leaving a part projecting laterally from the micro-cable. Then a voltage is applied to the bared end of the wire or wires to be connected as in the above description, until contact is made between the conductive core of the or each wire and the liquid conductive material C by perforation of the insulating sheath of the or each wire. Upon hardening of the material C the desired permanent connection is effected. The material C when hardened may then be covered with an insulating layer in any convenient manner, such as by wrapping the joint with insulating tape or by pouring over a hardenable insulator in the liquid state.

The process of this invention thus has the advantage of avoiding the need to single out the required wires of a cable before connection can be made, because each connection is only made to the wire at the end of which a voltage is applied and the insulation of which is broken by the applied voltage so as to contact the conductive core thereof with the liquid material C which, upon hardening, renders the connection permanent.

The method described is particularly advantageous for use on a bundle of micro-cables from which a number of lengths are to be cut, because by furnishing the bundle with terminals at various points before cutting, the preparatory operation of removing the insulation from one end of the wires need to be effected only once.

Figure 2:
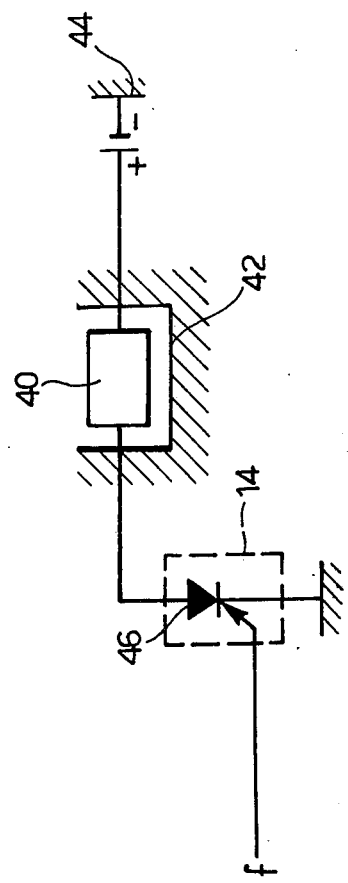
FIG. 2 diagrammatically illustrates an installation for distribution of energy in a vehicle including a micro-cable.

In FIG. 2 there is shown a typical application for micro-cables, showing how they may be used for distributing control signals to control the operation of components of a motor vehicle electrical system. FIG. 2 illustrates the connections of a windscreen wiper motor 40 of a vehicle generally indicated 42. The circuit includes a battery 44 of the electrical circuit of a vehicle 42 and a control device 14 shown for example as a controlled diode 46 (but which may be any suitable control device such as a transistor or a micro-relay). To the control gate of the diode is connected one wire of a micro-cable having terminals formed in the manner described above. Operation of the windscreen wiper motor 40 can thus be controlled by selectively applying a signal to the wire f of the micro-cable. This offers a considerable simplification and economy for wiring the electrical circuits of motor vehicles since the relatively larger current carrying wire to each power consuming device need run only from the battery to the device itself which is grounded via a control switch such as a controlled diode, the control terminal of which is connected to a switch of the control device in the passenger compartment. Much of the electrical circuit can thus be replaced by micro-cables and, by using the method of the invention, these can be easily equipped with terminals so that handling techniques for micro-cables are considerably simplified. The advantages of such a system over other systems of distribution of control signals, for example transceiver systems or multiwire systems having wires of the considerable greater dimensions which are required in order to make it possible for them to be equipped with terminals and connected by normal methods, for example soldering, are that the new system takes up much less space and is much less expensive both in terms of material costs and in labour costs for assembly.

Various modifications can be made to the process which has been particularly described by way of example.

For instance the voltage generator may be of any type which produces a waveform which drops suddenly when perforation upon dielectric breakdown has occurred.

We claim:

1. A method of attaching a conductive element to form a terminal to one of the wires of a cable with a plurality of wires, each wire having a conductive core covered by an insulating layer, and an outlet insulating cover holding all said wires together, comprising the steps of:

removing the insulating layer from one end of a wire to which said conductive element is to be attached to form a terminal at a point along the length of the cable, removing a portion of said outer insulating cover of said cable over a region on either side of said point, placing said conductive element adjacent said plurality of wires at said point, covering said wires and said conductive element with hardenable liquid conductive material, and applying between said conductive element and said one end of said wire to which said element is to be connected a voltage which rises until dielectric breakdown of the insulating layer around said wire occurs and then falls rapidly, said dielectric breakdown of said insulating layer causing perforation of said insulating layer and permitting said conductive liquid material to contact the conductive core of said wire, whereby upon subsequent hardening of said conductive liquid hardenable material a permanent connection of said terminal element to said wire is made.

2. The method of claim 1, wherein said voltage is a ramp waveform.

* * * * *